(12) United States Patent
Tanaka et al.

(10) Patent No.: US 8,309,660 B2
(45) Date of Patent: Nov. 13, 2012

(54) PERFLUOROELASTOMER SEAL MATERIAL

(75) Inventors: Hiroyuki Tanaka, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 49 days.

(21) Appl. No.: 12/903,474

(22) Filed: Oct. 13, 2010

(65) Prior Publication Data

US 2011/0028655 A1 Feb. 3, 2011

Related U.S. Application Data

(62) Division of application No. 10/572,779, filed as application No. PCT/JP2004/013743 on Sep. 21, 2004, now Pat. No. 7,834,096.

(30) Foreign Application Priority Data

Sep. 24, 2003 (JP) ................ 2003-332135

(51) Int. Cl.
*C08L 27/12* (2006.01)
(52) U.S. Cl. ............. 525/326.2; 525/275; 525/480; 428/141
(58) Field of Classification Search ............ 525/326.2, 525/275, 480; 428/141
See application file for complete search history.

(56) References Cited

U.S. PATENT DOCUMENTS

| | | | |
|---|---|---|---|
| 5,444,116 A * | 8/1995 | Amin et al. | 524/495 |
| 5,461,107 A * | 10/1995 | Amin et al. | 524/495 |
| 5,478,905 A * | 12/1995 | Anolick et al. | 526/254 |
| 5,565,512 A | 10/1996 | Saito et al. | |
| 5,637,663 A * | 6/1997 | Anolick et al. | 526/254 |
| 5,650,472 A * | 7/1997 | Tatemoto et al. | 526/254 |
| 6,303,705 B1 | 10/2001 | Shimizu | |
| 6,878,778 B1 * | 4/2005 | Kawasaki et al. | 525/275 |
| 7,125,598 B2 * | 10/2006 | Yamato et al. | 428/141 |
| 7,309,743 B2 * | 12/2007 | Kawasaki et al. | 525/326.2 |
| 2002/0183457 A1 | 12/2002 | Hintzer et al. | |
| 2003/0125463 A1 | 7/2003 | Tatsu et al. | |

FOREIGN PATENT DOCUMENTS

| | | |
|---|---|---|
| EP | 1209175 A1 * | 5/2002 |
| JP | 06-107803 | 4/1994 |
| JP | 09-111081 | 4/1997 |
| JP | 10-038089 | 2/1998 |
| JP | 2000-55204 | 2/2000 |
| JP | 2002310302 A | 10/2002 |
| WO | 2004/009661 A1 | 1/2004 |
| WO | 2004/069953 A1 | 8/2004 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

The present invention provides a perfluoroelastomer seal material in which adhesive strength, contamination, corrosion and color change of a contacted surface with a seal material are improved, and an amount of an uncrosslinked polymer component is at most 1% by weight, measured under specific conditions, and a process for preparing the same. The present invention relates to a perfluoroelastomer seal material, wherein a rate of weight decrease is at most 1% by weight when the seal material is immersed into perfluoro(tri-n-butyl) amine at 60° C. for 70 hours and is dried at 90° C. for 5 hours, 125° C. for 5 hours and 200° C. for 10 hours after taken out of the emersion. And, the present invention also relates to a process for preparing a perfluoroelastomer seal material comprising a step of treating with a solvent having at least 50% of a swelling rate based on said molded article, when said molded article is immersed at 60° C. for 70 hours.

6 Claims, 1 Drawing Sheet

PERFLUOROELASTOMER SEAL MATERIAL

CROSS REFERENCE TO RELATED APPLICATIONS

This is a divisional of U.S. application Ser. No. 10/572,779 filed Mar. 21, 2006, which is a 371 of PCT Application No. PCT/2004/013743 filed Sep. 21, 2004, which claims benefit of JP 2003-332135 filed Sep. 24, 2003. The above-noted applications are incorporated herein by reference in their entirety.

TECHNICAL FIELD

The present invention relates to a perfluoroelastomer seal material in which a rate of weight decrease is at most 1% by weight measured under the specific condition and a process for preparing the same.

BACKGROUND ART

A perfluoroelastomer of tetrafluoroethylene (TFE)-perfluorovinyl ethers are widely used in fields such as automobile industries, semiconductor industries and chemical industries as seal materials such as O-ring, a stem seal and a shaft seal, which are utilized under severe environments, in viewpoints of showing its prominent chemical resistance, solvent resistance and heat resistance.

These perfluoroelastomer seal materials are usually prepared by press vulcanization after mixing a perfluoroelastomer with a vulcanizer, a filler and various additives by a roll etc. Thereafter, it is general to further apply the second vulcanization for enhancing performance. However, a molecular chain of a perfluoroelastomer, which is a polymer with a high molecular weight, is cut out by stress received at processing and heating at the second vulcanization, and as a result, a component having a low molecular weight and an uncrosslinked polymer are generated. A seal material comprising a perfluoroelastomer containing a great amount of these component having a low molecular weight and uncrosslinked polymer adheres firmly to a part of the other material where the seal material is applied at use, which makes desorption of the seal material difficult, and has bad influence on the operation of a device at dynamic portions. Further, there is a problem such as causing stain, corrosion and color change on the other material by the component having a low molecular weight and the uncrosslinked polymer which bleed out. Since the component having a low molecular weight and uncrosslinked polymer are generated not only at polymerization but also in a step of processing, the problem can not be improved by decreasing the component having a low molecular weight etc due to improvement of a polymerization method, thus, it is necessary to remove the component having a low molecular weight after the process.

As a process for decreasing outgas from a seal material made of a fluorine rubber and inhibiting contamination of a vacuum chamber applied with the seal material, a process for contacting a crosslinked fluorine rubber with a solvent such as water is disclosed (for example, see JP-A-6-107803). However, since a perfluoroelastomer does not swell sufficiently with the solvent described in the publication, the component having a low molecular weight generated at processing etc can not be sufficiently removed from the inside of the molded article. As a result, firm adhesion and stain of the seal material can not be inhibited.

Also, as a treatment of a rubber core material of O-ring having a composite structure for improvement in vacuum performance, a process for removing outgas by a supercritical extraction treatment is disclosed (for example, see JP-A-10-38089 or JP-A-2000-55204). However, these processes do not directly improve adhesivity of a rubber substrate which is a base.

Therefore, the process for removing the component having a low molecular weight etc which causes increase of the adhesion strength, and stain, corrosion and color change of the part contacting with a seal material, and a perfluoroelastomer seal material in which the component having a low molecular weight has removed is not existed under the current situation.

The present invention provides a perfluoroelastomer seal material improved in adhesion strength to the material of the other end, and stain, corrosion and color change of the contact surface, wherein a rate of weight decrease is at most 1% by weight measured under particular conditions.

DISCLOSURE OF INVENTION

Namely, the present invention relates to a perfluoroelastomer seal material, wherein a rate of weight decrease of the seal material is at most 1% by weight when the seal material is dried at 90° C. for 5 hours, 125° C. for 5 hours, and 200° C. for 10 hours after immersing into perfluoro(tri-n-butyl) amine for 70 hours at 60° C. and taking it out.

The rate of weight decrease is preferably at most 0.5% by weight and more preferably at most 0.1% by weight.

A swelling rate is preferably at most 300% by weight when the seal material is immersed into perfluoro(tri-n-butyl) amine at 60° C. for 70 hours after conducting a heat treatment at 300° C. for 70 hours.

The present invention also relates to a process for preparing the perfluoroelastomer seal material comprising a step of treating with a solvent having a swelling rate of at least 50% against a perfluoroelastomer molded article, when the molded article is immersed at 60° C. for 70 hours.

BEST MODE FOR CARRYING OUT THE INVENTION

Figure 1:
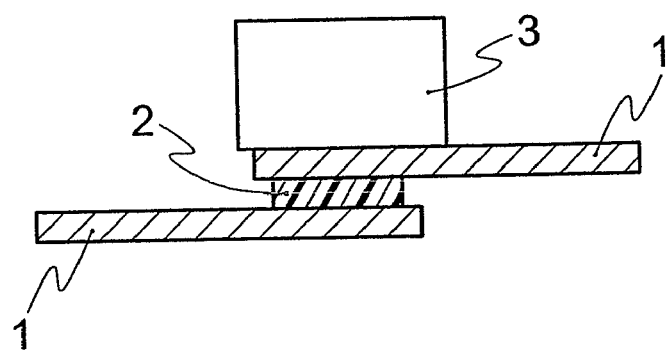
FIG. 1 is an explanatory diagram showing a process for treating a test piece for a measurement of adhesion strength.
Figure 2:
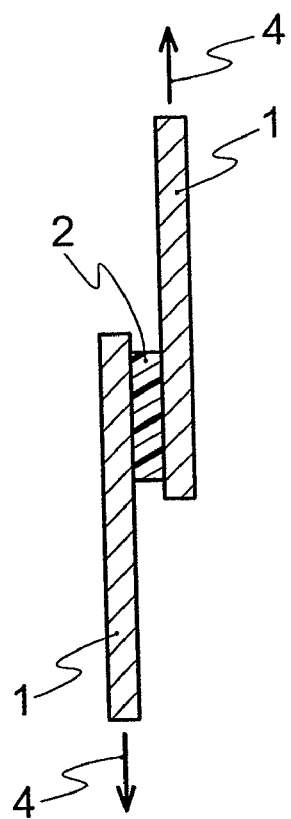
FIG. 2 is an explanatory diagram showing a process for measuring adhesion strength.

As for the perfluoroelastomer seal material of the present invention, the rate of weight decrease is at most 1% by weight, preferably at most 0.5% by weight, more preferably at most 0.4% by weight, further more preferably at most 0.3% by weight, and particularly preferably 0.1% by weight, when the seal material is dried at 90° C. for 5 hours, 125° C. for 5 hours, and 200° C. for 10 hours after immersing into perfluoro(tri-n-butyl) amine for 70 hours at 60° C. and taking it out. When the rate of weight decrease is more than 1% by weight, the seal material adheres to other material firmly, and it tends that the seal material contaminates and corrodes the other material according to the circumstances. Weight decrease of the seal material is caused by melting out an uncrosslinked polymer and a low molecular weight component existing in the perfluoroelastomer seal material into perfluoro(tri-n-butyl) amine. Herein, an example of the uncrosslinked polymer is a polymer which is not crosslinked when the seal material is formed, in which the crosslink is cut out. Examples of the low molecular weight component are a component which remains from at polymerization, a component which is not crosslinked sufficiently at forming the seal material, and a component which is obtained by cutting a molecular chain of an elastomer having a high molecular weight due to stress received at processing to form as a seal material and heating at the second vulcanization. The low molecular weight component is referred to as a component having a number average molecular weight of at most 10,000.

The measurement of a rate of weight decrease of the seal material is conducted by the steps in which:
(1) a weight of an untreated perfluoroelastomer seal material is measured (Ag);
(2) the seal material is dried at 90° C. for 5 hours, 125° C. for 5 hours, and 200° C. for 10 hours after immersing into perfluoro(tri-n-butyl) amine for 70 hours at 60° C. and taking it out; and,
(3) a weight of the seal material after drying is measured (Bg). The seal material's rate of weight decrease is calculated by $[(A-B)/A] \times 100$ (% by weight).

Also, a reason for employing perfluoro(tri-n-butyl) amine as an extraction solvent for measuring a rate of weight decrease is that any perfluoroelastomer can be sufficiently swelled.

A perfluoroelastomer is not particularly limited, as long as the perfluoroelastomer is used as a seal material, especially a seal material for a semiconductor manufacturing device. Herein, the perfluoroelastomer is referred to as an elastomer in which at least 90% by mol of the constitutional unit is constructed with perfluoro olefin.

Examples of the perfluoroelastomer are a perfluoro rubber (a), a thermoplastic perfluoro rubber (b), and a rubber composition comprising these perfluoro rubbers.

An example of the perfluoro rubber (a) is a rubber obtained by polymerizing tetrafluoroethylene/perfluoro (alkyl vinyl ether)/a monomer that gives a crosslinkable site. As for the composition, tetrafluoroethylene/perfluoro (alkyl vinyl ether) is preferably 50 to 90/10 to 50 (% by mol), more preferably 50 to 80/20 to 50 (% by mol) and further more preferably 55 to 70/30 to 45 (% by mol). Also, the monomer that gives a crosslinkable site is preferably 0 to 5% by mol, and more preferably 0 to 2% by mol based on a total amount of tetrafluoroethylene and perfluoro (alkyl vinyl ether). If the composition is out of these ranges, there is tendency to lose properties as a elastic body and to have the properties near to resins.

Examples of perfluoro (alkyl vinyl ether) in this case are perfluoro (methyl vinyl ether), perfluoro (ethyl vinyl ether), perfluoro (propyl vinyl ether) and perfluoro (butyl vinyl ether), and these can be used alone or in a combination arbitrarily.

Examples of a monomer giving a crosslinkable site are a monomer containing iodine or bromine represented by the general formula (1):

$$CX^1_2=CX^1-R_f^1CHR^1X^2 \quad (1)$$

(wherein $X^1$ is a hydrogen atom, a fluorine atom or $-OH_3$, $R^1$ is a hydrogen atom or $-OH_3$, $X^2$ is an iodine atom or a bromine atom, and $R_f^1$ is a fluoroalkylene group, a perfluoroalkylene group, a fluoropolyoxy alkylene group, or a perfluoropolyoxy alkylene group and may contain an oxygen atom of an ether bond) or
monomer represented by the general formula (2):

$$CF_2=CFO(CF_2CF(CF_3)O)_m-(CF_2)_n-X^3 \quad (2)$$

(wherein m is an integer of 0 to 5, n is an integer of 1 to 3, $X^3$ is a cyano group, a carboxyl group, an alkoxycarbonyl group or a bromine atom). These can be used alone or can be used in arbitrary combinations. The iodine atom, the bromine atom, the cyano group, the carboxyl group, and the alkoxycarbonyl group can function as the crosslinking site.

The perfluoro rubber (a) can be prepared by the usual method.

Specific examples of the perfluoro rubber (a) are perfluoro rubbers described in WO 97/24381 pamphlet, JP-B-61-57324, JP-B-4-81608 and JP-B-5-13961.

An example of the thermoplastic perfluoro rubber (b) is a multi-segmented fluorine-containing polymer comprising an elastomeric fluorine-containing polymer chain segment and a nonelastomeric fluorine-containing polymer chain segment, in which at least 90% by mol of each structural unit of the elastomeric fluorine-containing polymer chain segment and the nonelastomeric fluorine-containing polymer chain segment is perfluoroolefin.

First, the elastomeric fluorine-containing polymer chain segment is described. The elastomeric fluorine-containing polymer chain segment imparts flexibility to the polymer and has a glass transition temperature of at most 25° C., preferably at most 0° C. Examples of the perhalo olefin that constitute at least 90% by mol of the structural units thereof are tetrafluoroethylene, hexafluoropropylene and fluorovinylether represented by the general formula (3):

$$CF_2=CFO(CF_2CFX^4O)_p-(CF_2CF_2CF_2O)_q-R_f^2 \quad (3)$$

(wherein $X^4$ is a fluorine atom or $-CF_3$, $R_f^2$ is a perfluoroalkyl group having 1 to 5 carbon atoms, p is an integer of 0 to 5, q is an integer of 0 to 5).

Examples of the structural units other than perhalo olefin that constitute the elastomeric fluorine-containing polymer chain segment are fluorine-containing monomers such as vinylidene fluoride, trifluoroethylene, trifluoropropylene, tetrafluoropropylene, pentafluoropropylene, trifluorobutene, tetrafluoroisobutene and vinyl fluoride and non-fluorine monomers such as ethylene, propylene and alkyl vinyl ether.

A preferable example of the elastomeric fluorine-containing polymer chain segment is an polymer chain obtained by polymerizing tetrafluoroethylene/perfluoro(alkyl vinyl ether)/monomer that gives a crosslinking site. The composition thereof is preferably 50 to 85/50 to 15 (% by mol), the amount of a monomer that gives a crosslinkable site is preferably 0 to 5% by mol based on a total amount of tetrafluoroethylene and perfluoro (alkyl vinyl ether).

Examples of the monomer that gives a crosslinking site are iodine or bromine-containing monomers represented by the general formula (1), and monomers represented by the general formula (2).

The iodine atom, bromine atom, cyano group, carboxyl group, alkoxycarbonyl group can function as the crosslinking site.

Then, the nonelastomeric fluorine-containing polymer chain segment is described. Examples of the perfluoroolefin that constitute at least 90% by mol of the structural units of the nonelastomeric fluorine-containing polymer chain segment are perhalo olefins such as tetrafluoroethylene, perfluoro (alkyl vinyl ether), hexafluoropropylene, a compound represented by the general formula (4):

$$CF_2=CF(CF_2)_pX^5 \quad (4)$$

(wherein p is an integer of 1 to 10, $X^5$ is a fluorine atom), and perfluoro-2-butene.

Examples of the structural units other than perfluoro olefin that constitute the nonelastomeric fluorine-containing polymer chain segment are fluorine-containing monomers such as vinylidene fluoride, trifluoroethylene, trifluoropropylene, tetrafluoropropylene, pentafluoropropylene, trifluorobutene, tetrafluoroisobutene and vinyl fluoride and non-fluorine monomers such as ethylene, propylene and alkyl vinyl ether.

A preferable example of the nonelastomeric fluorine-containing polymer chain segment is a nonelastomeric polymer chain segment comprising 85 to 100% by mol of tetrafluoroethylene and 0 to 15% by mol of a compound represented by the general formula (5):

(wherein $R_f^3$ is $R_f^4$ or $-OR_f^4$, $R_f^4$ is a perfluoroalkyl group having 1 to 5 carbon atoms).

From the viewpoint of heat resistance of the obtained thermoplastic fluorine rubber (fluorine-containing multi-segmented polymer), the crystal melting point of the nonelastomeric fluorine-containing polymer chain segment is preferably at least 150° C., more preferably 200 to 360° C.

Namely, it is important that the fluorine-containing multi-segmented polymer is a fluorine-containing multi-segmented polymer in which the elastomeric fluorine-containing polymer chain segment and the nonelastomeric fluorine-containing polymer chain segment are bonded in a state of block or graft in one molecule.

For the process for preparing the fluorine-containing multi-segmented polymer, various known methods can be employed to obtain a fluorine-containing multi-segmented polymer by connecting the elastomeric segment and the non-elastomeric segment by blocking or grafting. Among these, the process for preparing a block-type fluorine-containing multi-segmented polymer described in JP-B-58-4728 and the process for preparing a graft-type fluorine-containing multi-segmented polymer described in JP-A-62-34324 are preferably employed.

Particularly, from the viewpoint that a homogeneous and regular segmented polymer having high segmentation ratio (block ratio) can be obtained, preferable is the block-type fluorine-containing multi-segmented polymer synthesized by the iodine transfer polymerization method described in JP-B-58-4728 and KOBUNSHI RONBUNSHU (Japanese Journal of Polymer Science and Technology) (Vol. 49, No. 10, 1992).

The elastomeric fluorine-containing polymer segment can be prepared by the iodine transfer polymerization method, which is known as a process for a preparing fluorine rubber (JP-B-58-4728 and JP-A-62-12734). An example is the method of emulsion polymerizing perhalo olefin and when necessary, a monomer that gives a crosslinking site in the presence of an iodine compound, preferably a diiodine compound, in an aqueous medium under pressure while stirring in the presence of a radical initiator in a substantially oxygen-free atmosphere. Typical examples of the diiodine compound that is used are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. These compounds may be used alone or in combination with one another. Particularly, 1,4-diiodoperfluorobutane is preferable. The amount of the diiodine compound is 0.01 to 1% by weight based on the total weight of the elastomeric fluorine-containing polymer chain segment.

The terminal of the elastomeric segment obtained in this way has an iodine atom that is the initiation point for block copolymerization of the nonelastomeric segment.

The radical polymerization initiator used for preparing the elastomeric segment in the present invention can be an initiator that has been conventionally used for polymerization of a fluorine elastomer. Examples of such initiators are organic and inorganic peroxides and azo compounds. Typical initiators are persulfates, carbonate peroxides and ester peroxides and a preferable initiator is ammonium persulfate (APS). APS can be used alone or can be used in combination with reducing agents such as sulfites and sulfite salts.

The elastomeric segment obtained in this way preferably has number average molecular weight of 5,000 to 750,000, particularly 20,000 to 400,000, from the viewpoint of imparting flexibility, elasticity and mechanical properties to the entire fluorine-containing multi-segmented polymer.

Subsequently, block copolymerization of the nonelastomeric segment to the elastomeric fluorine-containing polymer chain segment can be conducted subsequent to emulsion polymerization of the elastomeric segment by changing the monomer to those for a nonelastomeric segment.

The number average molecular weight of the obtained nonelastomeric segment can be adjusted within a wide range of 1,000 to 1,200,000, preferably 3,000 to 600,000.

The thermoplastic fluorine rubber (b) obtained in this way is composed mainly of polymer molecules in which nonelastomeric segments are bonded to both sides of the elastomeric segment, and polymer molecules in which a nonelastomeric segment is bonded to one side of the elastomeric segment. The amount of polymer molecules comprising elastomeric segments only, to which nonelastomeric segments are not bonded, is at most 20% by weight, preferably at most 10% by weight, based on the total amount of polymer molecules and segments in the fluorine-containing multi-segmented polymer.

In the present invention, a composition comprising the fluorine rubber (a) and the thermoplastic fluorine rubber (b) described above can be used.

The fluorine rubber composition comprising the perfluoro rubber (a) and the thermoplastic perfluoro rubber (b) can be obtained by mixing the perfluoro rubber (a) and the thermoplastic perfluoro rubber (b) in a dispersion or by dry blending them with an open roll in any ratio.

The perfluoroelastomer seal material of the present invention is formed by using a composition comprising such perfluoroelastomer, a crosslinking agent, and a crosslinking aid.

The crosslinking agent can be selected suitably depending on the type of crosslinking system adopted. As a crosslinking system, any of a polyamine crosslinking system, a polyol crosslinking system, a peroxide crosslinking system, and an imidazole crosslinking system can be used. A triazine crosslinking system, an oxazole crosslinking system, and a thiazole crosslinking system etc can be also used. Among these crosslinking agents, an imidazole crosslinking system, a triazine crosslinking system, an oxazole crosslinking system, and a thiazole crosslinking system are preferable, and an imidazole crosslinking system, an oxazole crosslinking system, and a thiazole crosslinking system are more preferable, in viewpoints that heat resistance and adhesion strength of the seal material are excellent, and stain and color change on a contact surface are improved.

Examples of the crosslinking agent used in polyol crosslinking are polyhydroxy compounds such as bisphenol AF, hydroquinone, bisphenol A and diaminobisphenol AF; in peroxide crosslinking, examples are organic peroxides such as α,α'-bis(t-butylperoxy)diisopropylbenzene, 2,5-dimethyl-2,5-di(t-butylperoxy)hexane and dicumylperoxide; and, in polyamine crosslinking, examples are polyamine compounds such as hexamethylenediamine carbamate and N,N'-dicinnamylidene-1,6-hexamethylenediamine.

Examples of the crosslinking agent used for triazine crosslinking are organic tin compounds such as tetraphenyl tin and triphenyl tin.

Examples of the crosslinking agent used for oxazole crosslinking, imidazole crosslinking and thiazole crosslinking are a bisdiaminophenyl crosslinking agent, a bisaminophenol crosslinking agent, a bisaminothiophenol crosslinking agent, represented by the general formula (6):

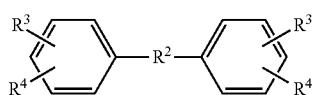
(6)

(wherein $R^2$ is —$SO_2$—, —O—, —CO—, an alkylene group having 1 to 6 carbon atoms, a perfluoroalkylene group having 1 to 10 carbon atoms or a single bond, one of $R^3$ and $R^4$ is —$NH_2$ and the other is —$NHR^5$, —$NH_2$, —OH or —SH, $R^5$ is a hydrogen atom, a fluorine atom or a monovalent organic group, preferably $R^3$ is —$NH_2$, and $R^4$ is —$NHR^5$), a bisamidrazone crosslinking agent represented by the general formula (7):

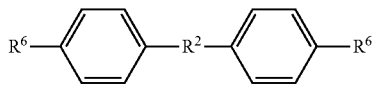
(7)

(wherein $R^2$ is the same as the above and $R^6$ is

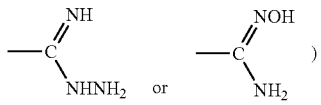
)

and a bisamidoxime crosslinking agent represented by the formula (8) or (9):

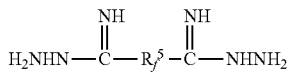
(8)

(wherein $R_f^5$ is a perfluoroalkylene group having 1 to 10 carbon atoms),

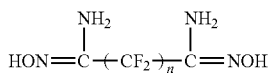
(9)

(wherein n is an integer of 1 to 10). These bisaminophenol crosslinking agents, bisaminothiophenol crosslinking agents and bisdiaminophenyl crosslinking agents have conventionally been used in crosslinking systems wherein the crosslinking site is a cyano group, but also react with a carboxyl group and an alkoxycarbonyl group and form an oxazole ring, thiazole ring and an imidazole ring to give a crosslinked article.

Particularly preferably crosslinking agents are compounds having several 3-amino-4-hydroxyphenyl groups, 3-amino-4-mercaptophenyl groups and the compound represented by the formula (10):

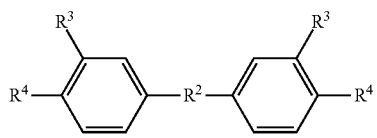
(10)

(wherein $R^2$, $R^3$ and $R^4$ are the same as measured above) and specific examples are 2,2-bis(3-amino-4-hydroxyphenyl) hexafluoropropane (generic name: bis(aminophenol)AF), 2,2-bis(3-amino-4-mercaptophenyl)hexafluoropropane, tetraaminobenzene, bis-3,4 (diaminophenyl)methane, bis(3,4-diaminophenyl)ether, 2,2-bis-(3,4-diaminophenyl)hexafluoropropane and 2,2-bis-[3-amino-4-(N-phenylamino)phenyl] hexafluoropropane.

An amount of the crosslinking agent is 0.01 to 10 parts by weight, preferably 0.1 to 5 parts by weight, based on 100 parts by weight of the elastomer. When the amount is less than 0.01 part by weight, performance of a fluorine-containing molded article tends to be damaged since the degree of crosslinking is insufficient, and when the amount is more than 10 parts by weight, in addition to have a long crosslinking time because of too high crosslinking degree, it tends to be unfavorable economically.

As a crosslinking aid of a polyol vulcanizing system, organic salt commonly used for vulcanizing an elastomer such as various quarterly ammonium salts, quarternary phosphonium salt, cyclic amine, or one functional amine compound can be employed. Concrete examples are quarternary ammonium salt such as tetrabutylammonium bromide, tetrabutylammonium chloride, benzyltributylammonium chloride, benzyltriethylammonium chloride, tetrabutylammonium hydrogen sulfate, or tetrabutylammonium hydroxide: quarterly phosphonium salt such as benzyltriphenylphosphonium chloride, tributylallylphosphonium chloride, tributyl-2-methoxypropylphosphonium chloride, or benzylphenyl(dimethylamino)phosphonium chloride, one functional amine such as benzylmethylamine or benzylethanolamine; and cyclic amine such as 1,8-diazabicyclo[5.4.0]-undeca-7-ene.

Examples of a crosslinking aid of peroxide crosslinking are triallylcyanurate, triallylisocyanurate (TAIC), tris(diallylamine-s-triazine), triallylphosphite, N,N-diallylacrylamide, hexaallylphosphoramide, N,N,N',N'-tetraallyltetraphthlamide, N,N,N',N'-tetraallylmaronamide, trivinylisocyanurate, and 2,4,6-trivinylmethyltrisiloxane, tri(5-norbornene-2-methylene)cynurate. Among those, triallylisocyanurate (TAIC) is preferable in viewpoint of vulcanization and properties of a vulcanized article.

An amount of the crosslinking is preferably 0.01 to 10 parts by weight based on 100 parts by weight of the elastomer, and more preferably 0.1 to 5.0 parts by weight. When the crosslinking aid is less than 0.01 part by weight, crosslinking time tends to become long enough not to stand for practical use, and when more than 10 parts by weight, compression permanent strain tends to become low as well as too short vulcanizing time.

Furthermore, usual additives such as a filler (inorganic filler such as carbon black, organic filler such as a polyimide resin powder), a processing aid, metal oxides such as magnesium oxide, and metal hydroxides such as calcium hydroxide can be used for the present invention, as long as the purpose of the present invention is not impaired.

The perfluoroelastomer seal material of the present invention preferably has a swelling rate of at most 300% when the seal material is immersed into perfluoro(tri-n-butyl) amine at 60° C. for 70 hours after treating with heat at 300° C. for 70 hours in viewpoints that heat resistance and adhesion strength of the seal material are excellent, and stain and color change on a contact surface are improved. The swelling rate is preferably at most 275%, and more preferably at most 250%. The specific conditions for the treatment are described in the following.

(1) After treating with heat in air at 300° C. for 70 hours,
(2) volume of the perfluoroelastomer seal material is measured by the underwater substitution method (C1),
(3) the seal material is immersed into the object solvent (perfluoro(tri-n-butyl) amine) at 60° C. for 70 hours, and
(4) the volume of the seal material in a state of swelling is measured (D1), after taking out.

The swelling rate of the seal material is calculated by (D1−C1)/C1×100(%). In addition, a seal material having a swelling rate of at most 300% does not include a seal material in which a swelling rate can not be measured due to a reason such as dissolving the seal material in the above operations (1) to (4).

The process for preparing the perfluoroelastomer seal material of the present invention comprises a step of treating a perfluoroelastomer molded article with a specific solvent (for example, a solvent having a swelling rate of at least 50° when immersing at 60° C. for 70 hours).

A process for molding a perfluoroelastomer is not particularly limited, as long as it is a general molding process, but conventionally known processes such as compression molding, extrusion molding, transfer molding and injection molding can be used.

A solvent used in the treatment may be a single solvent or a mixed solvent combining at least two kinds, in which a swelling rate is at least 50% when immersing at 60° C. for 70 hours, and preferably at least 80%. When a swelling rate is less than 50%, it tends that a great amount of time is required for extraction of a low molecular weight component and uncrosslinked polymer.

A solvent used in the treatment is preferably a single solvent or a mixed solvent combining at least two kinds, in which a swelling rate is at least 50% when immersing at 40° C. (at a temperature of a boiling point in case that a boiling point of a solvent is less than 40° C.) for 70 hours, and preferably at least 80% in a viewpoint that the above described effects can be further obtained.

As for the above described solvent, perhalo solvents in which all of hydrogen atoms are replaced with halogen atoms is preferable, and perfluoro solvents in which all hydrogen atoms are replaced with fluorine atoms are particularly preferable. Specific examples of perfluoro solvents are perfluoro tertiary amines such as perfluoro(tri-n-butyl) amine and perfluorotriethylamine, perfluoro tetrahydrofuran, perfluoro benzene, Fluorinert FC-77 (available from Sumitomo 3M Limited), DEMNUM Solvent (available from Daikin Industries Ltd., main component: $C_6F_{14}$), R-318 (available from Daikin Industries Ltd., main component: $C_4F_8Cl_2$), and Fluorinert FC-43 (available from Sumitomo 3M Limited, main component: $(C_4F_9)_3N$), and among these solvents, perfluoro (tri-n-butyl) amine and Fluorinert FC-77 are preferable in viewpoint of convenience of handling.

Also, the solvents may be any solvent which meets the conditions mentioned above, but it is preferable to use, for instance, various fluorine solvents other than the above examples. Specific examples are perfluoro alkane, HFC (hydrofluorocarbon), HFE (hydrofluoro ether), and HCFC (hydrochlorofluorocarbon), and more specific examples are HFE-7100 (available from Sumitomo 3M Limited, main component: $C_4F_9OCH_3$), HFE-7200 (available from Sumitomo 3M Limited, main component: $C_4F_9OC_2H_3$), and Vertrel XF (available from DuPont Kabushiki Kaisha, main component: $C_5H_2F_{10}$).

Examples of a process for treating are a process for immersing into a solvent, a process for exposing to a solvent steam, a process for spraying a solvent, Soxhlet extraction or processes similar to thereof, and a process of supercritical extraction. A low molecular weight component and an uncrosslinked polymer can be effectively extracted in the process of supercritical extraction by using the above described solvents as an entrainer, for example, even when carbon dioxide gas is used as an extraction medium.

Conditions for immersion when the prefluoro elastomer seal material is immersed into the above described solvents can be suitably decided by a kind of solvent in use and a composition of a perfluoroelastomer, but as favorable conditions, it is preferable to immerse at a room temperature to 250° C. (more preferably at a room temperature to 200° C.) for 1 to 100 hours, and more preferable to immerse at a room temperature to 100° C. for 48 to 70 hours. Also, it is preferable to treat under a high pressure.

Also, as conditions for drying when the seal material is dried after immersing or spraying, it is preferable to dry at most 250° C. for at least 5 hours, and more preferable to dry at 200° C. for at least 10 hours. As for a process for drying, processes which can be generally used such as drying by an oven and vacuum drying can be utilized.

It is considered that a perfluoroelastomer swells due to treating with the above described solvent, a low molecular weight component and an uncrosslinked polymer are dissolved into the solvent from a gap generated by swelling.

The prefluoro elastomer seal material obtained by the preparation process of the present invention does not bring about stain on the other material contacting to the seal material, corrosion and color change since adhesion strength is small due to containing a small amount of a low molecular weight component etc.

The prefluoro elastomer seal material of the present invention can be utilized favorably in the following fields.

In the related field of semiconductors such as a semiconductor manufacturing device, a liquid crystal panel manufacturing device, a plasma panel manufacturing device, plasma address liquid crystal panel, a field emission display panel and a substrate of a solar battery, examples are an O (square) ring, a packing, a seal material, a tube, a roll, a coating, a lining, a gasket, a diaphram, and a hose, and these can be used for a CVD device, a dry etching equipment, a wet etching equipment, an oxidization dispersion diffuser, a sputtering equipment, an ashing equipment, a wet scrubber, an ion implanter, an exhauster, a chemical fitting, and a gas fitting. Concretely, examples are used as an O-ring and seal material for a gate bulb, an O ring and a seal material for a quartz window, an O ring and seal material for a chamber, an O ring and a seal material for a gate, an O ring and a seal material for a bell jar, an O ring and a seal material for a coupling, an O ring, a seal material, a diaphragm for a pump, an O ring and seal material for a semiconductor gas regulator, an O ring and seal material of a resist solution and a pealing solution, a hose and a tube for a wafer washing solution, a roll for a wafer transport, a lining and a coating for a resist solution vessel and a pealing solution vessel, a lining and a coating for a wafer washing vessel or a lining and a coating for a wet etching vessel. Furthermore, examples are used for a sealant•sealing agent, a coating of quartz for a optical fiber, an electric components for the purpose of insulation, vibration proof, water proof and damp proof, a potting, a coating and an adhesive seal for a circuit board, gasket for magnetic storage, a modifier for a sealant material such as epoxy and a sealant for a clean room•clean facility.

In the field of automobiles, a gasket, a shaft seal, a valve stem seal, a sealing material or a hose can be employed for an engine and peripheral equipment, a hose and a sealing material is used for an AT equipment, an O (square) ring, a tube, a packing, a core material of a valve, a hose, a sealing material and a diaphragm can be employed for a fuel system and peripheral equipment. Concretely, examples are an engine head gasket, a metal gasket, a sump gasket, a crank shaft seal, a cam shaft seal, a valve stem seal, a manifold packing, an oil hose, a seal for a fuel pump, an ATF hose, an injector O ring, an injector packing, a fuel pump O ring, a diaphragm, a fuel hose, a crank shaft seal, a gear box seal, a power piston packing, a seal for a cylinder liner, a seal for a valve stem, a front pump seal of an automatic shaft, a rear accelerator pinion seal, a gasket of an universal joint, a pinion seal of a speedometer, a piston cup of a foot brake, an O ring of torque transmission, an oil seal, an autoexhaust a seal for a reheating equipment, a bearing seal, an EGR tube, a twin carb tube, a diaphragm for the sensor of a carburetor, a vibration-proof rubber (an engine mount, an exhaust out-let), a hose for an reheating equipment, and an oxygen sensor bush.

In the field of aircraft, rockets and, ships and vessels, examples are a diaphragm, an O (square) ring, a valve, a tube, a packing, a hose, and a sealing material, and these can be employed for a fuel system. Concretely, in the field of an aircraft, a jet engine valve stem seal, a fueling hose, a gasket and an O ring, a rotating shaft seal, a gasket of a hydraulic machine, and a seal for a fire resisting wall, and in the field of ships and vessels, examples are a shaft stern seal for a propel, a valve stem seal for a breather of a diesel engine, a valve seal of a butterfly valve, and a seal for a shaft of a butterfly valve.

In the field of chemical products such as a plant, examples are a lining, a valve, a packing, a roll, a hose, a diaphragm, an O (square) ring, a tube, a sealing material, and a chemical resistance coating, and these can be employed for processes of manufacturing chemicals such as medicine, agricultural chemicals, and coating, plastic. Concretely, examples are a seal of a pump for chemicals, a flow indicator and a pipe, a seal of heat exchanger, a packing for a glass condenser of sulfuric acid manufacturing equipment, a seal of a spray plane and an agricultural chemicals transport pump, a seal of gas piping, a seal for a plating solution, a packing of a high temperature vacuum dryer, a koroseal of a belt for paper manufacturing, a seal of a fuel battery, a joint seal of wind channel, a trichlene resistance roll (for fiber dyeing), an acid resistance hose (for concentrated sulfuric acid), a packing of a tube connecting part of gas chromatography and a pH meter, a chloride gas transport hose, a rain water drain hose of a benzene or toluene storage tank, and a seal, a tube, a diaphragm and a valve of an analytical equipment and a physical and chemical equipment.

In the field of chemicals such as medical drugs, the shaped article of the present invention is employed as a plug for chemicals.

In the field of photography such as a developing equipment, in the field of printing such as printing machinery, and in the field of coating such as coating facility, an example is a roll, and each of them is employed as a roll for a film developing machine—an X-ray film developing machine, a printing roll and coating roll. Concretely, examples are a developing roll of a film developing machine•an X-ray film developing machine, a gravure roll and a guide roll of a printing roll, a gravure roll of a magnetic tape manufacture coating line of a coating roll, a guide roll of a magnetic tape manufacture coating line, and various coating rolls. Furthermore, examples are a seal of a xerography machine, a printing roll, a scraper, a tube and a part of a valve of a printing equipment, a coating roll, a scraper, a tube, and a part of a valve of coating facility, an ink tube, a roll and a belt of a printer, a belt and a roll of a xerography machine, and a roll and a belt of a printing machine.

Also, a tube can be used in the field of analytical•physical and chemical equipment.

In the field of food plants, examples are a lining, a valve, a packing, a roll, a hose, a diaphragm, an O (square) ring, a tube, a seal material and a belt, and these can be used in a process of manufacturing food. Concretely, examples are used as a seal for a plate heat exchanger and a seal of an electric magnetic valve for a vending machine.

In the field of atomic power plant equipment, examples are a packing, an O ring, a hose, a seal material, a diaphragm, a valve, a roll and a tube.

In the field of iron and steel such as an iron plate processing facility, an example is a roll and is used for a roll for an iron plate processing and the like.

In the field of general industries, examples are a packing, an O ring, a hose, a seal material, a diaphragm, a valve, a roll, a tube, a lining, a mandrel, an electric cable, a flexible joint, a belt, a rubber plate, a weather strip, and a roll, a roll blade and a belt for a PPC copying machine. Concretely, a seal of a hydrauric, lubricating machine, a bearing seal, a seal for a window and other parts of a dry cleaning equipment, a seal for an uranium hexafluoride condenser, a seal (vacuum) valve for a cyclotron, a seal for an automatic packaging machine, a diaphragm for a sulfurious acid gas and chlorine gas analytical pump (a pollution finder), a roll, a belt and a roll of an acid cleaning aperture for a printing machine.

In the field of electricity, concretely, examples are an insulating oil cup for a bullet train, a benching seal for a liquid ring trance, and a jacket for an oil well cable.

In the field of fuel batteries, concretely, examples are used for electrodes, a seal material between or between separators, and a seal for a hydrogen•oxygen•purified water pipe.

In the field of electric components, specific examples are used for a raw material of a heat releasing material, a raw material of an electromagnetic waves shield material, a modifier for a print circuit board pre-preg plastic such as an epoxy, a shatterproof material such as a bulb, and a gasket for a hard disc drive of a computer.

Hereinafter, the present invention is explained with Examples, but is not limited thereto.

PREPARATION EXAMPLE 1

An autoclave made of stainless steel having a volume of 3 liters without an ignition resource was charged with 1 liter of purified water, 10 g of a compound represented by the following formula:

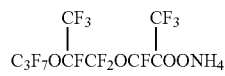

as an emulsifier, and 0.09 g of disodium hydrogen phosphate•12 hydrate as a pH adjuster, the inside of the autoclave was sufficiently displaced with nitrogen gas and deaerated thereof, then, a temperature was raised to 50° C. while agitating at 600 rpm, and the autoclave was charged with a mixed gas of tetrafluoroethylene (TFE) and perfluoro (methyl vinyl ether) (PMVE) (a molar ratio of TFE/PMVE=25/75) to have an internal pressure at 0.78 MPa·G. Subsequently, 10 ml of a solution of ammonium persulphate (APS) having a concentration of 527 mg/ml was pressed into the autoclave at a pressure of nitrogen to initiate a reaction.

3 g of $CF_2$=$CFOCF_2CF(CF_3)OCF_2CF_2CN$(CNVE) is pressed into the autoclave at a pressure of nitrogen at a point when an internal pressure is lowered to 0.69 MPa·G by progress of polymerization. Then, 4.7 g of TFE and 5.3 g of PMVE are pressed into at each pressure thereof to have a pressure at 0.78 MPa·G. After that, 3 g of CNVE was pressed into the autoclave at a pressure of nitrogen respectively at a point when the total amount of TFE and PMVE reached to 70 g, 130 g, 190 g and 250 g, accompanying with TFE and PMVE are pressed into in the same manner along with progress of the reaction, repeating increasing and lowering a pressure in a range of 0.69 to 0.78 MPa·G.

After 19 hours from the initiation of the polymerization reaction, the autoclave was cooled down, unreacted monomers were released to obtain 1,330 g of an aqueous dispersion having a concentration of a solid content of 21.2% by weight at a point when the total charged amount of TFE and PMVE reached to 300 g.

1,196 g out of this aqueous dispersion medium was diluted with 3,588 g of water, and added into 2,800 g of a hydrochloric acid solution having a concentration of 3.5% by weight slowly while agitating. A coagulate was filtered after agitating for 5 minutes after adding, the obtained polymer was further vacated into 2 kg of HCFC-141b to agitate for 5 minutes, and filtered again. Then, after repeating 4 more times of washing with this HCFC-141b and filtering thereof, 240 g of a polymer was obtained by vacuum drying for 72 hours at 60° C.

As a result of $^{19}F$—NMR analysis, a monomer unit composition of this polymer was TFE/PMVE/CNVE=56.6/42.3/1.1% by mol. When measured with an infrared spectro analysis, characteristic absorption of a carboxyl group was recognized to appear around 1,774.9 $cm^{-1}$ and 1,808.6 $cm^{-1}$, and that of an OH group was recognized to appear around 3,557.5 $cm^{-1}$ and 3,095.2 $cm^{-1}$.

PREPARATION EXAMPLE 2

An autoclave made of stainless steel having a volume of 6 liters without an ignition resource was charged with 2 liter of purified water, 20 g of $C_7F_{15}COONH_4$ as an emulsifier, and 0.18 g of disodium hydrogen phosphate•12hydrate as a pH adjuster, the autoclave was sufficiently displaced with nitrogen gas and deaerated thereof, then, a temperature was raised up at 80° C. while agitating at 600 rpm, and the autoclave was charged with a mixed gas of tetrafluoroethylene (TFE) with perfluoro(methylvinyl ether) (PMVE) (TFE/PMVE=29/71 molar ratio) to have an internal pressure at 12.0 $kgf/cm^2$·G. Subsequently, 2 ml of a solution of ammonium persulphate (APS) having a concentration of 186 mg/ml was pressed into the autoclave at a pressure of nitrogen to initiate a reaction.

4 g of $I(CF_2)_4I$ was pressed into the autoclave at a point when an internal pressure was lowered to 11.0 $kgf/cm^2$·G by progress of polymerization. Then, 22.0 g of TFE and 20.0 g of PMVE were pressed into at each pressure thereof, repeating increasing and lowering a pressure. 1.5 g of $ICH_2CF_2CF_2OCF$=$CF_2$ was pressed into the autoclave at a pressure of nitrogen respectively at a point when the total amount of TFE and PMVE reached to 430 g, 511 g, 596 g and 697 g. 2 ml of an APS solution having a concentration of 20 mg/ml was pressed onto at a pressure of nitrogen every 12 hours after the reaction was initiated.

After 45 hours from the initiation of the polymerization reaction, the autoclave was cooled down, unreacted monomers were released to obtain an aqueous dispersion having a concentration of a solid content of 30.0% by weight, at a point when the total charged amount of TFE and PMVE reached to 860 g.

A beaker was charged with this aqueous dispersion, coagulation was carried out by freezing the aqueous dispersion in dry ice/methanol, after thawing, 850 g of a rubbery polymer was obtained by washing a coagulated article with water and vacuum drying. Mooney viscosity ML1+10 (100° C.) of this polymer was 55.

As a result of $^{19}F$—NMR analysis, a monomer unit composition of this polymer was TFE/PMVE=64.0/36.0 (% by mol), and an iodine amount found by the elemental analysis was 0.34% by weight.

EXAMPLE 1

A fluorine-containing elastomer containing a cyano group having a carboxyl group at the end, which was obtained in Preparation Example 1, 2,2-bis[3-amino-4-(N-phenylamino) phenyl]hexafluoropropane (AFTA-Ph), which is an crosslinking agent synthesized by a method described in Journal of Polymer Science, the edition of Polymer Chemistry, Vol. 20, pages 2,381 to 2,393 (1982), and carbon black (Thermax N-990, available from Cancarb Limited), which is a filler, were mixed at a weight ratio of 100/2.83/20, and the mixture was kneaded in an open roll to prepare a crosslinkable fluorine rubber composition.

This fluorine rubber composition was pressed and crosslinked with 180° C. for 30 minutes, and then oven crosslinking was conducted in an oven at 290° C. for 18 hours to prepare a molded article having a thickness of 2 mm and a size of 20 mm×15 mm.

The obtained molded article was immersed into Fluorinert FC77 (registered trademark, available from Sumitomo 3M Limited, main component: $C_8F_{16}O$) at 60° C. for 70 hours (a rate of swelling was 170% at this time), and then dried at 90° C. for 5 hours, at 125° C. for 5 hours, and at 200° C. for 10 hours to prepare a tested sample. A rate of weight decrease of the tested sample was at most 0.1% by weight.

A measurement of the adhesion strength of this tested sample and an evaluation of the degree of color change were conducted according to the following methods. The results are shown in Table 1.

<Measurement of Rate of Weight Decrease>
(1) A weight of an untreated perfluoroelastomer seal material was measured (Ag);
(2) After immersing the seal material into perfluoro (tri-n-butyl) amine for 70 hours at 60° C. and taking out therefrom, the molded article was dried in an oven preset to be at 90° C. for 5 hours, then dried at a preset temperature of 125° C. in the oven for 5 hours, and further dried at a preset temperature of 200° C. for 10 hours; and
(3) a weight of the seal material after drying was measured (Bg). The seal material's rate of weight decrease was calculated by [(A−B)/A]×100 (% by weight).

<Swelling Rate of Seal Materials>
(1) A volume of an untreated perfluoroelastomer seal material was measured by the underwater substitution method (C1),
(2) the seal material was immersed into the object solvent at 60° C. for 70 hours, and
(3) the volume of the seal material in a state of swelling was measured (D), after taking out. The swelling rate of the seal material was calculated by [(D−C)/C]×100(%).

<Adhesion Strength>

As shown in FIG. 1, a tested sample 2 (20 mm×15 mm×2 mm) was placed between two sheets of SUS316 boards 1, and rstanded for 20 hours at 250° C. under a load 3 of 700 g/cm². Then, SUS316 boards 1 was pulled in the shearing direction of 4 to measure adhesion strength (180 degree, shear peeling) after cooling to at a room temperature under keeping a load 3 added.

<Degree of Color Change on SUS316 Boards>

The tested sample was peeled from the SUS boards after measuring adhesion strength, a state of the SUS boards was visually observed to evaluate according to the following standard.

SUS boards do not change in color. ◯
SUS boards change in color. X

<Swelling Rate after Treatment with Heat>

(1) After treating with heat in air at 300° C. for 70 hours,
(2) volume of the perfluoroelastomer seal material was measured by the underwater substitution method (C1),
(3) the seal material was immersed into the object solvent perfluoro(tri-n-butyl) amine at 60° C. for 70 hours, and
(4) the volume of the seal material in a state of swelling was measured (D1), after taking out.

The swelling rate of the seal material was calculated by [(D1−C1)/C1]×100(%).

EXAMPLE 2

Experiments were conducted in the same manner as Example 1 except for immersing the obtained molded article into DEMNUM Solvent (available from Daikin Industries Ltd., main component: $C_6F_{14}$) at 40° C. for 70 hours (a swelling rate was 158% at this time), in place of immersing into Fluorinert FC-77 at 60° C. for 70 hours. Results are shown in Table 1.

EXAMPLE 3

Experiments were conducted in the same manner as Example 1 except for immersing the obtained molded article into HFE-7100 (available from Sumitomo 3M Limited, main component: $C_4F_9OCH_3$) at 40° C. for 70 hours (a swelling rate was 114% at this time) in place of immersing into Fluorinert FC-77 at 60° C. for 70 hours. Results are shown in Table 1.

EXAMPLE 4

Experiments were conducted in the same manner as Example 1 except for immersing the obtained molded article into HFE-7200 (available from Sumitomo 3M Limited, main component: $C_4F_9OC_2H_5$) at 40° C. for 70 hours (a swelling rate was 95% at this time) in place of immersing into Fluorinert FC-77 at 60° C. for 70 hours. Results are shown in Table 1.

EXAMPLE 5

Experiments were conducted in the same manner as Example 1 except for immersing the obtained molded article into Vertrel XF (available from DuPont Kabushiki Kaisha, main component: $C_5H_2F_{10}$) at 40° C. for 70 hours (a swelling rate was 99% at this time) in place of immersing into Fluorinert FC-77 at 60° C. for 70 hours. Results are shown in Table 1.

EXAMPLE 6

Experiments were conducted in the same manner as Example 1 except for immersing the obtained molded article into R-318 (available from Daikin Industries Ltd., main component: $C_4F_8Cl_2$) at 40° C. for 70 hours (a swelling rate was 181% at this time), in place of immersing into Fluorinert FC-77 at 60° C. for 70 hours. Results are shown in Table 1.

EXAMPLE 7

Experiments were conducted in the same manner as Example 1 except for immersing the obtained molded article into Fluorinert FC-43 (available from Sumitomo 3M Limited, main component: $(C_4F_9)_3N$) at 40° C. for 70 hours (a swelling rate was 142% at this time) in place of immersing into Fluorinert FC-77 at 60° C. for 70 hours. Results are shown in Table 1.

EXAMPLE 8

A fluorine-containing elastomer containing iodine obtained in Preparation Example 2, triallyl isocyanurate (TAIC: available from Nippon Kasei Chemical Co., Ltd), as a crosslinking agent, 2,5-dimethyl-2,5-bis(t-butylperoxy)hexane (perhexa 25B: available from NOF Corporation), and carbon black (Thermax N-990, available from Cancarb Limited), as a filler, were mixed at a weight ratio of 100/2/1/20, and the mixture was kneaded in an open roll to prepare a crosslinkable fluorine rubber composition.

This fluorine rubber composition was pressed and crosslinked at 160° C. for 10 minutes and then, oven crosslinking was conducted in an oven at 180° C. for 4 hours, to prepare a molded article having a thickness of 2 mm and a size of 20 mm×15 mm.

The obtained molded article was immersed into Fluorinert FC77 (registered trademark, available from Sumitomo 3M Limited, main component: $C_8F_{16}O$) at 60° C. for 70 hours (a rate of swelling was 100% at this time), and then dried at 90° C. for 5 hours, at 125° C. for 5 hours, and at 200° C. for 10 hours to prepare a tested sample. A rate of weight decrease of the tested sample was at most 0.1% by weight.

EXAMPLE 9

Experiments were conducted in the same manner as Example 1 except for immersing the obtained molded article into Fluorinert FC-77 (available from Sumitomo 3M Limited, main component: $(C_4F_9)_3N$) at 60° C. for 24 hours (a swelling rate was 170% at this time) in place of immersing into Fluorinert FC-77 at 60° C. for 70 hours. Results are shown in Table 1.

EXAMPLE 10

Experiments were conducted in the same manner as Example 1 except for immersing the obtained molded article into Fluorinert FC-77 (available from Sumitomo 3M Limited, main component: $(C_4F_9)_3N$ at 180° C. for 24 hours (a swelling rate was 175% at this time) in place of immersing into Fluorinert FC-77 at 60° C. for 70 hours. Results are shown in Table 1.

Also, immersion was conducted in a pressure vessel since a boiling point of Fluorinert FC-77 is 100° C. A pressure at this time was about 0.14 MPa.

COMPARATIVE EXAMPLE 1

Experiments were conducted in the same manner as Example 1 except that a step of treating with a solvent having a swelling rate of at least 50% when immersed at 60° C. for 70 hours was not carried out. A rate of weight decrease of a tested sample was 1.3% by weight.

Results of a measurement of the adhesion strength of this tested sample and an evaluation of the degree of color change are shown in Table 1.

COMPARATIVE EXAMPLE 2

Experiments were conducted in the same manner as Example 1 except for immersing the obtained molded article into ZEOROLA (available from ZEON Corporation, main component: $C_5H_3F_7$) at 40° C. for 70 hours (a swelling rate was 8% at this time), in place of immersing into Fluorinert FC-77 at 60° C. for 70 hours. Results are shown in Table 1.

Further, molded articles obtained in Examples 1 to 10 and Comparative Example 2 were immersed into solvents employed in Examples 1 to 10 and Comparative Example 2 at 40° C. for 70 hours, 60° C. for 70 hours, 60° C. for 24 hours or 180° C. for 24 hours, and the swelling rates are shown in Table 2.

TABLE 1

|  | Rate of weight decrease (% by weight) | Adhesion strength (kg/cm²) | Degree of SUS color change | Swelling rate after treatment with heat (%) |
|---|---|---|---|---|
| Ex. 1 | ≦0.1 | 5.6 | ○ | 210 |
| Ex. 2 | ≦0.1 | 5.1 | ○ |  |
| Ex. 3 | 0.5 | 6.1 | ○ |  |
| Ex. 4 | 0.5 | 5.7 | ○ |  |
| Ex. 5 | 0.2 | 6.7 | ○ |  |
| Ex. 6 | 0.2 | 6.4 | ○ |  |
| Ex. 7 | ≦0.1 | 6.9 | ○ |  |
| Ex. 8 | ≦0.1 | 6.0 | ○ |  |
| Ex. 9 | 0.3 | 6.2 | ○ | 210 |
| Ex. 10 | ≦0.1 | 5.1 | ○ | 210 |
| Com. Ex. 1 | 1.3 | 10.5 | X |  |
| Com. Ex. 2 | 1.2 | 10.9 | X |  |

TABLE 2

|  |  | Swelling rate (%) | | | |
|---|---|---|---|---|---|
|  | Solvent | 60° C./70 hours | 40° C./70 hours | 60° C./24 hours | 180° C./24 hours |
| Ex. 1 | $C_8F_{16}O$ | 170 | 170 | — | — |
| Ex. 2 | $C_6F_{14}$ | — | 158 | — | — |
| Ex. 3 | $C_4F_9OCH_3$ | — | 114 | — | — |
| Ex. 4 | $C_4F_9OC_2H_5$ | — | 95 | — | — |
| Ex. 5 | $C_5H_2F_{10}$ | — | 99 | — | — |
| Ex. 6 | $C_4F_8Cl_2$ | — | 181 | — | — |
| Ex. 7 | $(C_4F_9)_3N$ | 170 | 142 | — | — |

TABLE 2-continued

|  |  | Swelling rate (%) | | | |
|---|---|---|---|---|---|
|  | Solvent | 60° C./70 hours | 40° C./70 hours | 60° C./24 hours | 180° C./24 hours |
| Ex. 8 | $C_8F_{16}O$ | 100 | — | — | — |
| Ex. 9 | $(C_4F_9)_3N$ | — | — | 170 | — |
| Ex. 10 | $(C_4F_9)_3N$ | — | — | — | 175 |
| Com. Ex. 2 | $C_5H_3F_7$ | — | 8 | — | — |

INDUSTRIAL APPLICABILITY

The present invention provides a perfluoroelastomer seal material in which adhesion strength, and stain, corrosion and color change on a contact surface with the seal material are improved, and a rate of weight decrease is at most 1% by weight measured under particular conditions. Further, the present invention provides a preparation process of the perfluoroelastomer seal material comprising a step of treating a perfluoroelastomer molded article with a solvent having a swelling rate of at least 50% when immersed at 60° C. for 70 hours, and the preparation process in which a component having a low molecular weight and an uncrosslinked polymer can be significantly removed.

The invention claimed is:

1. A perfluoroelastomer seal material, wherein a rate of weight decrease is at most 1% by weight when the seal material is dried at 90° C. for 5 hours, 125° C. for 5 hours and 200° C. for 10 hours after immersing into perfluoro(tri-n-butyl) amine at 60° C. for 70 hours and taking out the same,
   wherein the perfluoroelastomer seal material is obtained by crosslinking a perfluoroelastomer through at least one crosslinking system selected from the group consisting of an imidazole crosslinking system, a triazine crosslinking system, an oxazole crosslinking system and a thiazole crosslinking system.

2. The perfluoroelastomer seal material of claim 1, wherein said rate of weight decrease is at most 0.5% by weight.

3. The perfluoroelastomer seal material of claim 1, wherein said rate of weight decrease is at most 0.1% by weight.

4. The perfluoroelastomer seal material of claim 1, wherein a swelling rate is at most 300% when immersed into perfluoro (tri-n-butyl) amine at 60° C. for 70 hours after carrying out heat treatment at 300° C. for 70 hours.

5. The perfluoroelastomer seal material of claim 2, wherein a swelling rate is at most 300% when immersed into perfluoro (tri-n-butyl) amine at 60° C. for 70 hours after carrying out heat treatment at 300° C. for 70 hours.

6. The perfluoroelastomer seal material of claim 3, wherein a swelling rate is at most 300% when immersed into perfluoro (tri-n-butyl) amine at 60° C. for 70 hours after carrying out heat treatment at 300° C. for 70 hours.

* * * * *